United States Patent

[11] 3,534,794

| [72] | Inventor | Mathias Edward Schilbred |
| | | 52C Drammensveien, Oslo, Norway |
| [21] | Appl. No. | 695,203 |
| [22] | Filed | Jan. 2, 1968 |
| [45] | Patented | Oct. 20, 1970 |
| [32] | Priority | Jan. 2, 1967 |
| [33] | | Norway |
| [31] | | 166,220 |

[54] APPARATUS FOR SLICING OR CUTTING OF FRUIT AND VEGTABLES, ESPECIALLY ONION
3 Claims, 4 Drawing Figs.

[52] U.S. Cl. .................................... 146/78, 146/124, 146/160
[51] Int. Cl. .................................... B26d 3/26, B26d 1/28
[50] Field of Search .......................... 146/68, 69, 78, 124, 125, 159, 160, 114, 116, 108, 128

[56] References Cited
UNITED STATES PATENTS

| 1,157,013 | 10/1915 | Lewis | 146/124 |
| 1,212,915 | 1/1917 | Daughtry | 146/124X |
| 3,335,772 | 8/1967 | Menge | 146/68 |

*Primary Examiner*—W. Graydon Abercrombie
*Attorney*—Waters, Roditi and Schwartz

ABSTRACT: An apparatus for cutting fruits and vegetables comprising a container, a rotary slicing and slitting member capable of vertical movement and a reciprocable, nonrotary chopping element associated therewith, said container having a lid therefor with actuating means for said member and said element projecting through said lid.

Patented Oct. 20, 1970 3,534,794
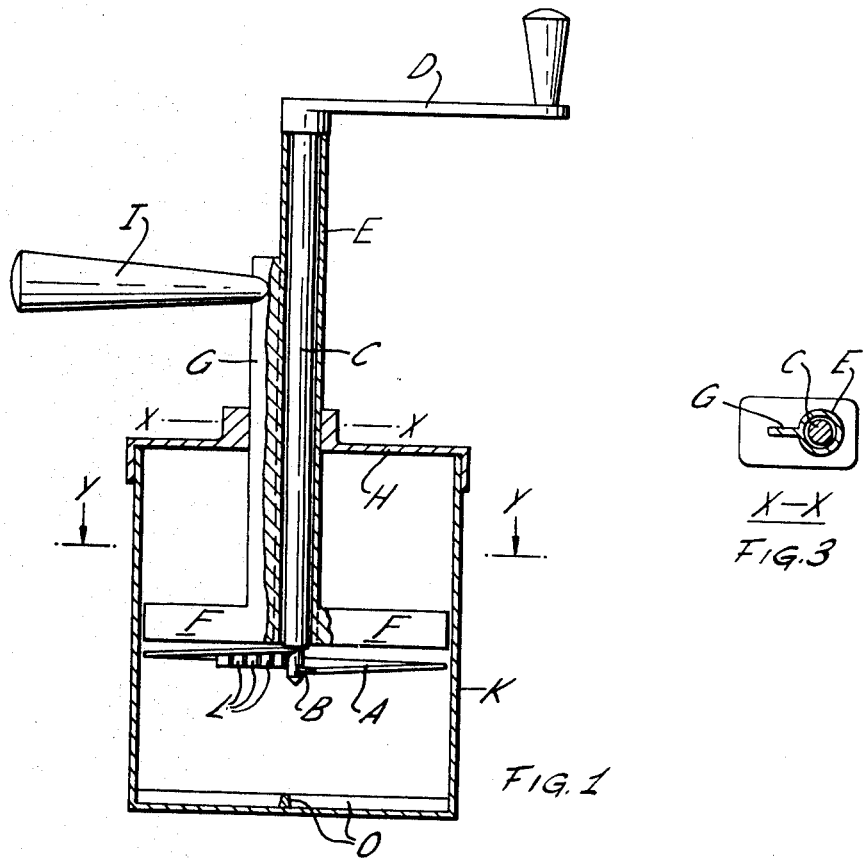
FIG. 1
FIG. 3 X—X
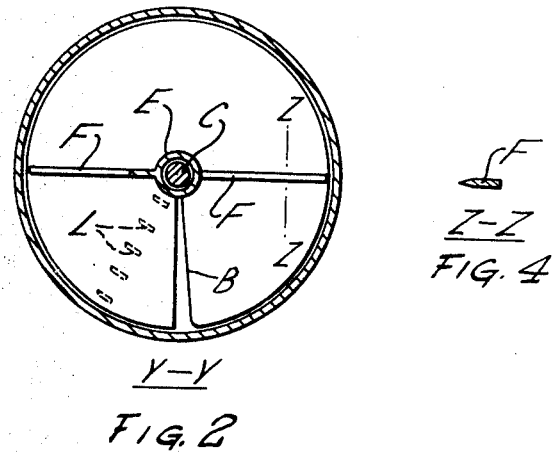
FIG. 2 Y—Y
FIG. 4 Z—Z

APPARATUS FOR SLICING OR CUTTING OF FRUIT AND VEGTABLES, ESPECIALLY ONION

The present invention relates to an apparatus for slicing or cutting fruits and vegetables, especially onion. The apparatus comprises a container provided with a closable lid and centrally in which a vertical rotatable shaft is arranged to the lower end of which a cutting disc is secured.

There are known several proposals for such apparatuses by means of which, for example, onion can be cut in a closed container so that the disagreeable smell released by cutting can be avoided. Thus it has been proposed to arrange rotatable knives in closable casings or containers for convenient cutting up or slicing of onion or the like.

The present invention has for its object the provision of such an apparatus which optionally can cut slices, sectors of slices or smaller pieces of for instance an onion. This is obtained by simple and solid means.

Further stated there is according to the invention proposed an apparatus of the above mentioned kind so arranged that the cutting disc with its lower surface rests against the object to be sliced or cut, said object being placed in the lower part of the container, the cutting disc further being secured to the lower end of a shaft which is axially displaceable in the container lid and that there are arranged one or more vertically arranged just above the cutting disc knife-blades which are nonrotatable but axially displaceable arranged in the container.

To have a better understanding of the invention this is given a further description under reference to an embodiment disclosed as an invention in the drawing.

In the drawing, FIG. 1 is a partially broken away side view of the apparatus;

FIG. 2 is a view along the line Y–Y in FIG. 1;

FIG. 3 is a view along the line X–X in FIG. 1; and

FIG. 4 is a view along the line Z–Z in FIG. 2.

The apparatus according to the example shown comprises a cutting disc having the form of a part of a helical disc A having a pitch in accordance with the desired slice thickness, the lower edge of said helical disc being formed as a knife edge B. The helical disc is secured to one end of a shaft C which at the other end is provided with a hand crank D. The shaft rotates in a tube E to which one or more vertical knives F are secured, having their edges directed to the top surface of the helical disc so that there is a small clearance between the knives F and the upper part of the helical disc. The tube E is provided with an outwardly extending rib G, the lid H having a corresponding aperture so that the tube E cannot be given any relative rotation in relation to the lid but being able to be displaced axially. A handle I is secured to the tube E. The cylindrical container is denoted K and has a diameter somewhat greater than the diameter of the helical disc. The container bottom is provided with radially extending ribs O. The lid H can be secured to the container by means of threads. To the helical disc A small knives L can be secured which, when the disc rotates, move in concentric circles. Such a set of knives is used when the object for example an onion, is to be cut into small pieces.

The helical disc A in accordance with a modification can be replaced by a cylindric plane disc having a radially extending slit in which a knife is arranged. Such a cutting disc is know per se, but has not been used in connection with the remaining components comprising the present apparatus.

The function of the apparatus is as follows:

The object to be cut is placed centrally at the bottom of the container K. The lid with its cutting mechanism is placed at the top of the container and fastened. With the left hand the operator grasps the handle I and presses the helical disc A down against the object. Thereby the object is pressed against the ribs O which prevent rotation of the object. At the same time the operator rotates the crank D by his right hand. The helical disc thereby cuts itself downwardly and cuts the onion or the like into a long continuous helical slice, which gradually grows up at the top of the helical disc and is forced against the stationary knives F, whereby it is divided into greater or smaller separate slices or sectors depending on the number of knives.

If the onion or the like is to be cut into small pieces, knives L are inserted. The method is the same as described above. The only difference is that the knives L cut the onion or the like into concentric circles before it is helically cut. The onion or the like is thereby cut into short strips which accumulate at the top of the helical disc. These strips are then brought down to the bottom of the container and pass the knives once more. When such a process is repeated some times the onion or the like is finely chopped.

Instead of hand crank the apparatus can be connected to a domestic motor.

I claim:

1. Apparatus for slicing or cutting fruit and/or vegetables, comprising a container, a cap for closing one end of the container and having an aperture, a shaft extending axially through the aperture on either side of the cap and rotatable and axially displaceable relative to the cap, a cutting disc secured to one end of the shaft and knife blade means capable of being nonrotatably mounted in but displaceable longitudinally of the container wherein the shaft is freely supported in coaxial tube means having a handle guide means and the said knife blade means secured to opposite ends thereof, the tube means being received in the aperture so that the tube means is nonrotatably axially displaceable in the aperture and the knife blade means is at the end of the tube nearest the cutting disc on the shaft.

2. Apparatus according to claim 1, wherein the cutting disc is a helical surface disc having a lower radial edge formed as a knife edge.

3. Apparatus according to claim 1, including means for securing a plurality of auxiliary knife-blades on a radial line of the cutting disc.